United States Patent [19]
Paull

[11] 3,846,951
[45] Nov. 12, 1974

[54] ON SITE METHOD OF ERECTING A WALL STRUCTURE AND A WEATHER GASKET JOINT

[75] Inventor: David Paull, Big Rapids, Mich.

[73] Assignee: Swiss Aluminium Ltd., Chippis, Switzerland

[22] Filed: Mar. 21, 1973

[21] Appl. No.: 343,546

[52] U.S. Cl............................ 52/741, 52/400, 52/235
[51] Int. Cl............................. E04g 21/00, E04b 2/88
[58] Field of Search.............................. 52/396–400, 52/476, 498, 207–209, 235, 400, 741; 29/423, 427, 450

[56] References Cited
UNITED STATES PATENTS

| | | | |
|---|---|---|---|
| 1,375,420 | 4/1921 | Schumacher | 52/206 |
| 1,605,583 | 11/1926 | Heymer | 52/476 |
| 1,793,127 | 2/1931 | Osius | 52/498 |
| 3,336,707 | 8/1967 | Horgan | 52/400 |

Primary Examiner—Henry C. Sutherland
Assistant Examiner—James L. Ridgill, Jr.
Attorney, Agent, or Firm—David A. Jackson; Robert H. Bachman

[57] ABSTRACT

An on site method of erecting a wall structure and a weather gasket joint.

5 Claims, 6 Drawing Figures

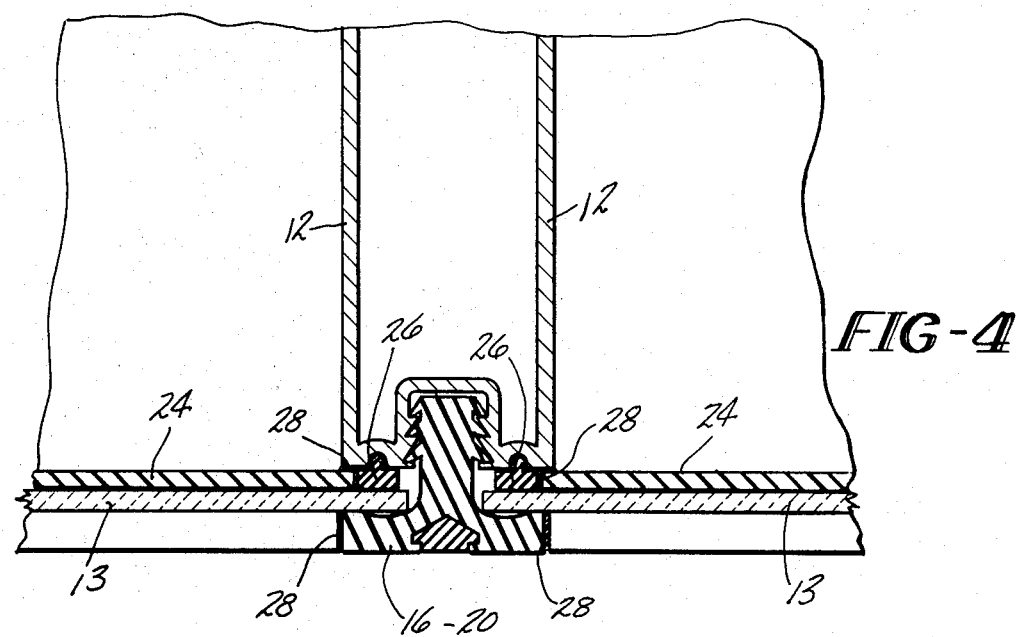
FIG-4
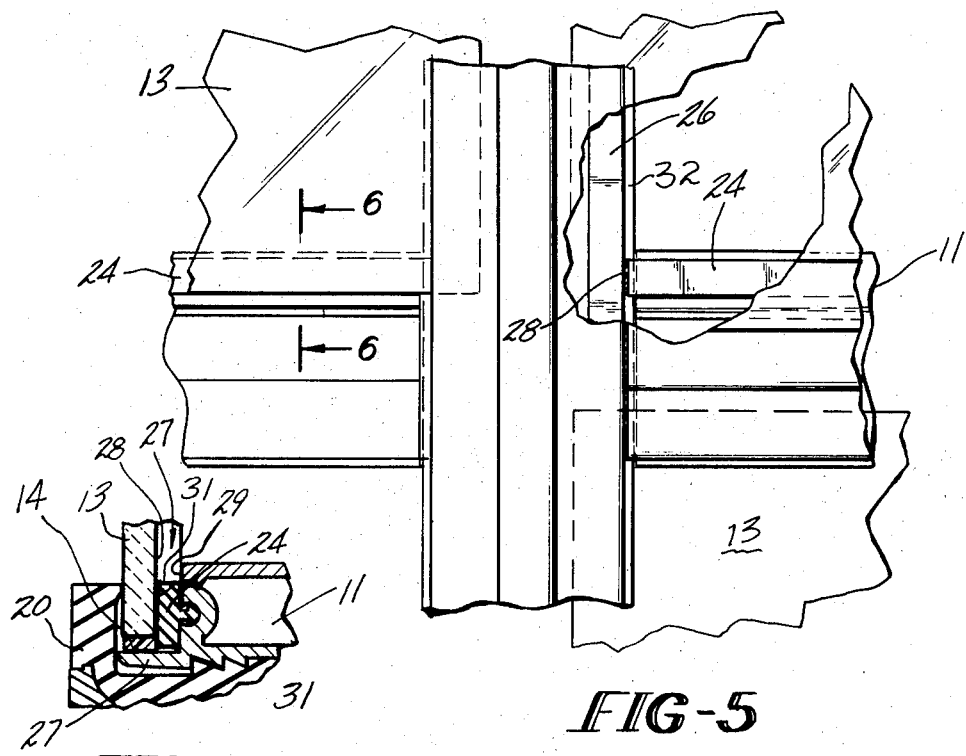
FIG-5
FIG-6

ON SITE METHOD OF ERECTING A WALL STRUCTURE AND A WEATHER GASKET JOINT

BACKGROUND OF THE INVENTION

The present invention relates to curtain wall structures and in particular relates to a simplified on site erection method.

The invention also relates to a novel interior or internal gasket joint structure.

Presently, the exterior walls of many newly constructed buildings are fabricated on site by securing an open framework or grid of longitudinal and vertical support members to the basic load bearing structure of the building. The open framework is then closed by inserting spaced closure panels.

The panels are then sealed to weather by means of internal and external peripheral gaskets.

The present invention deals with the installation of the external gaskets normally inserted in the joint between adjacent panels by driving or otherwise forcing a molded deformable gasket of a predetermined cross section into the joint. The panel is thus sealed to weather and retained permanently. Usually a projection of the external gasket makes an interlocking mechanical connection with the support members to hold the panels against lateral or outward movement.

The external gasket is usually expanded, after installation, by insertion of a separate locking key or strip in well known fashion. Thus, it is understood that subsequent references to elongated, one-piece deformable gasket members and to segmental gasket members are intended to include (but are not limited to) the class of gaskets which are expanded by locking key or strip.

The invention also deals with a novel internal gasket structure which inhibits flow of water into the interior of a building by providing a step or recess which eliminates straight line flow inwardly.

Representative examples of prior art wall structures including support members, gaskets and panels, are shown and described in U.S. Pat. Nos. 3,309,122; 3,336,707; 3,435,579; and 3,488,828.

In the succeeding specification and claims it is intended that the language "panel" or "closure panel" refer to and include plate glass, metal, plastic or laminated sheets commonly used in the building trade to fabricate walls, partitions or curtain walls.

A particular feature of the invention is a provision of a simplified method of inserting, sealing and retaining closure panels relative to horizontal and vertical support members.

A further feature of the invention is the provision of a novel, on site panel erection method which produces a minimum of external gasket joints.

A still further feature of the invention is the provision of a fast on site panel erection process affording long continuous spans of exterior panel gaskets in either the longitudinal or vertical direction.

Stated otherwise, the exterior gasket installation method or process of the present invention contemplates sealing the joint between many pairs of adjacent panels progressively and continuously in a given direction without cutting the gasket and thereby eliminating undesirable gasket joints.

A further feature of the invention is the provision of an interior gasket joint structure which after final assembly of the panel to its mating support structure develops a gasket joint which is offset from the support member thereby eliminating a straight line path for water or other condensate leading from the interior face of the panel to the interior of the building.

A novel erection method embracing certain features of the present invention may include the steps of inserting panels into mating openings of a panel support grid structure, providing a plurality of elongated one-piece exterior gaskets having a given cross sectional configuration, providing a plurality of short segmental portions of said elongated one-piece gasket, inserting said segmental portions at spaced intervals along joints defined by adjacent panels to retain the panels temporarily in a fixed position, and thereafter progressively inserting one of said elongated one-piece gaskets while progressively removing said segmental portions effective to retain and seal the panels permanently.

A novel interior gasket joint structure embracing certain of the principles of the invention may comprise a panel support structure having peripheral, lateral load bearing surface, a mating panel having a peripheral margin operable to overlay said bearing surface, and a deformable interior gasket sandwiched between said bearing surface and said peripheral margin so that upon final installation of said panel a peripheral recess is formed around the margin of said panel generally defining a U-shaped configuration in cross section, one side of said recess being defined by said bearing surface, a second side of said recess being defined by said margin and a third side of said recess being defined by said interior gasket.

Other features and advantages of the present invention will become more apparent from an examination of the succeeding specification and claims when read in conjunction with the appended drawings, in which:

FIG. 4 is a transverse sectional view of a portion of FIG. 1 taken along the plane represented by the line 4—4;

FIG. 5 is an enlarged view of the encircled portion of FIG. 1 as indicated by the reference numeral 5; and FIG. 6 is a vertical sectional view of a portion of FIG. 5 as viewed in the direction of the arrows labelled 6—6.

Figure 1:
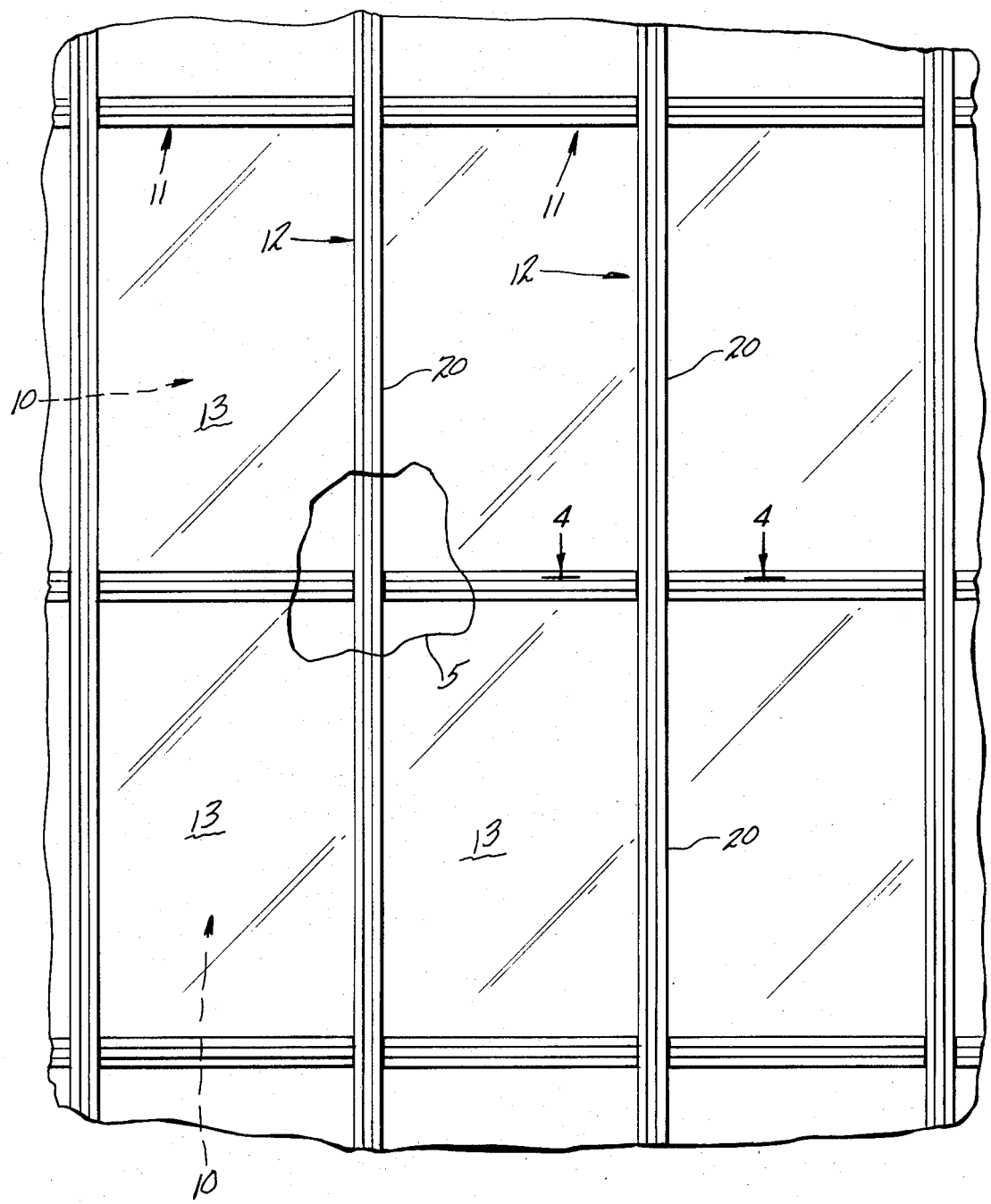
FIG. 1 is an elevational view from the weather side of a finished wall embracing the principles of the present invention.
Figure 2:
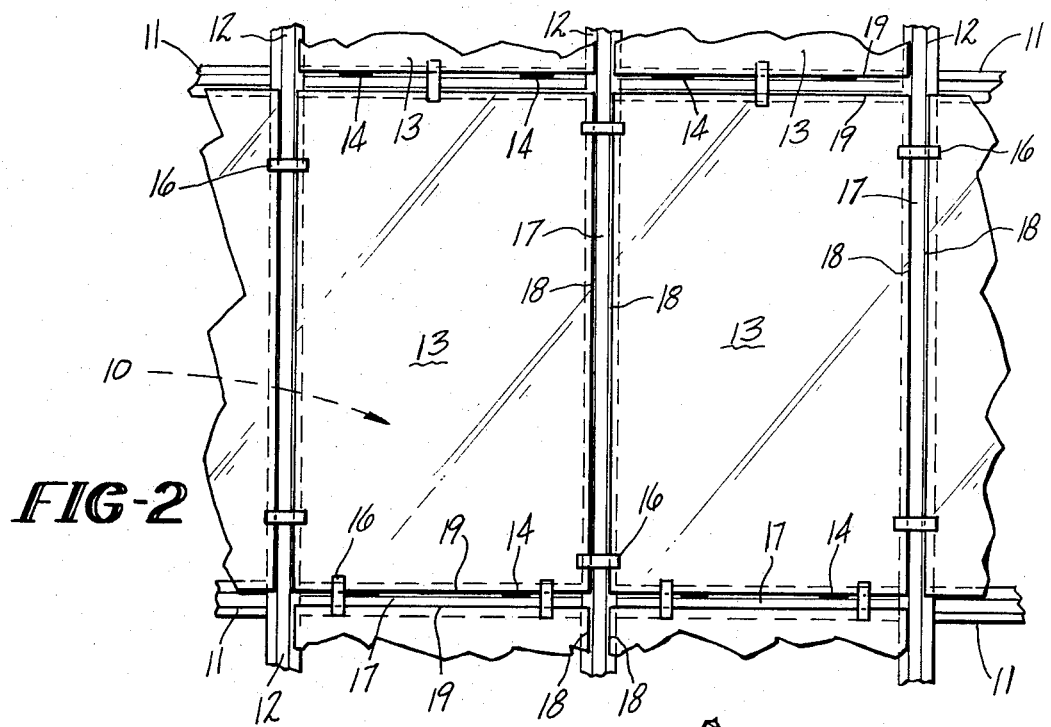
FIG. 2 is a weather side view of a portion of a wall showing closure panels set temporarily.
Figure 3:
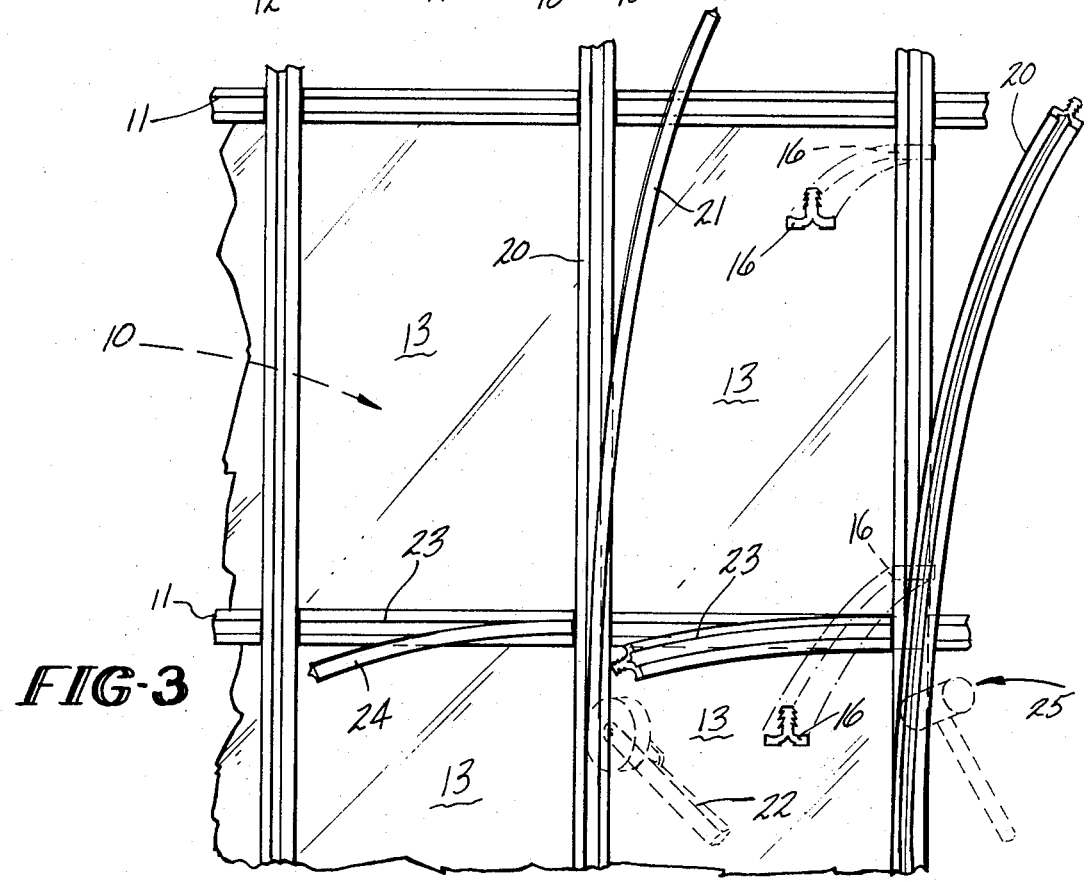
FIG. 3 shows the steps of progressive removal of the segmental gaskets and the subsequent insertion of the continuous one-piece elongated exterior gaskets.

Referring now to FIGS. 1, 2 and 3 horizontal support members 11—11 cooperate with vertical support members 12—12 to define an open frame or grid 10 closed by panels 13—13.

The panels 13—13 are initially set upon load-bearing clips (not shown) projecting outwardly from the plane of the wall, said clips being an integral part of the horizontal segment of the metal grid. The panels 13—13 are isolated from the clips in usual fashion by setting blocks 14—14, comprising an elastomer compound; the panels 13—13 are dimensioned so that peripheral margins overlay the support members 11 and 12 as is most apparent in FIG. 2.

On site or at some other convenient location, short segmental gasket members 16 are prepared by cutting or dividing an elongated one-piece gasket 20 into short segments preferably to a dimension of about ½ inch measured along the length of a one-piece gasket.

The segmental gaskets 16 are necessarily of the same cross sectional configuration as that of the elongated gasket 20 and are utilized to retain the panels 13 temporarily as is most apparent in FIG. 2.

The segmental gaskets 16 are inserted into the panel joints 17 defined by adjacent panel edges 18—18 (vertical) and 19—19 (horizontal).

The segmental gaskets 16 are inserted at spaced intervals along horizontal and vertical panel joints 17 and are driven into an interlocking relationship with support members 11 and 12. A representative example of the gasket-support member interlocking relationship is shown in FIG. 4. Segmental gaskets 16 and elongated one-piece gaskets 20 interlock in the same fashion.

Initially, the panels 13 are retained temporarily permitting an installer to set panels over a fairly wide expanse of wall structure prior to final installation of the elongated one-piece gasket 20. Note that although FIG. 2 shows segmental gaskets 16 set along vertical support members 12 as well as along horizontal support members 11, frequently it is not necessary to utilize vertical segmental gaskets because the horizontally disposed segmental gaskets alone provide adequate temporary panel retention.

As is apparent in FIG. 3, after temporary placement of a desired number of panels 13 the installer begins progressively and continuously to install the elongated one-piece gaskets 20 while progressively removing segmental gaskets 16. The elongated one-piece gasket 20 is driven into the joint 17 by utilizing an appropriate manual or automatic hammer indicated by the reference number 25 and as short segmental gaskets 16 are encountered, they are removed and replaced by the one-piece gasket. As stated previously, the elongated gasket 20 is driven into an interlocking mechanical fit with the mating frame member in the same fashion as the interlocking is effected by the segmental gaskets.

Obviously one has the choice of proceeding with the installation of the elongated gasket from the top of a wall in a downward direction or from the bottom upwardly as is convenient.

After the gasket 17 is driven home, the exterior or weather portion of the gasket is swelled or expanded by the insertion of a key or expansion strip 21 by means of a conventional plowing or insertion tool indicated by the reference number 22.

After the elongated gaskets 20 are inserted, corresponding gaskets 23—23 with cooperating keys 24 are inserted in the horizontal panel joints 17 between the vertical gaskets 20 as shown in FIG. 3.

Note that the installation of the one-piece gasket 20 according to the method described has the advantage of permitting the use of gaskets of indefinite length vertically, thereby eliminating undesirable gasket joints as in other prior art methods.

It is also apparent that, in certain particular instances, the elongated gasket 20 may be installed continuously without joints in the horizontal direction, if desired, eliminating undesirable gasket joints horizontally; in that case, the vertical gaskets must be dimensioned to fit between the continuous horizontal gasket spans.

As is most apparent in FIGS. 4, 5 and 6, it is in almost all instances necessary to provide interior or internal gaskets on the inner side of panels 13 to insure further a weather tight seal. Horizontal gasket 24 seated in mating horizontal frame member 11 abuts vertical interior gasket 26 seated against vertical frame member 12. Horizontal and vertical interior gaskets 24 and 26 are so dimensioned that a generally U-shaped recess 27 is formed (FIG. 6). One side of the recess 27 is defined by a peripheral margin 28 of the panel 13, a second side is defined by bearing surface 29 of support member 11 and the third side is defined by the top 31 of horizontal gasket 24.

The interior gaskets 24 and 26 operate to create a step or an offset between the mating horizontal and vertical support members as indicated by the reference numeral 32 in FIG. 5.

This internal gasket arrangement precludes a straight line path for water or other condensate tending to move from the interior face of the panel 13 into the interior of the building.

Abutting ends or joints of all gaskets are suitably painted with sealant compound as at 28—28 in FIGS. 4 and 5 for obvious reasons.

It is anticipated that a variety of modifications can be devised in the method and structure of the present invention without departing from the principles and scope. For example, the mechanical interlock between the exterior gasket and the support frame disclosed is merely representative of a wide variety of such interlocking structure.

What is claimed is:

1. In the method of closing an open framework of interconnecting longitudinal and vertical support members to form a wall by inserting spaced closure panels, retaining and sealing said panels by driving an elongated, deformable gasket into interlocking relationship with the support members, said elongated gasket closing joints between adjacent panels, the improvement comprising the steps of:

providing a plurality of elongated, one-piece, deformable gaskets having a given cross-sectional configuration, dividing at least one of said elongated gaskets into a plurality of short, segmental gaskets, inserting said closure panels, retaining said closure panels temporarily by driving said segmental gaskets into interlocking relationship with the support members at spaced intervals within said joints, thereafter progressively inserting and driving said elongated gaskets into said joints while progressively removing said segmental gaskets whereby said panels are retained and sealed permanently.

2. The method of claim 1 where the progressive insertion and driving of said one-piece elongated gasket and the progressive removal of said segmental gaskets occur continuously and extends along the joint of at least two pairs of panels.

3. The method of claim 1 where the progressive insertion of said one-piece elongated gasket occurs continuously from one story to the next adjacent story of a multi-story structure.

4. The method of claim 1 where the segmental gaskets are inserted at spaced intervals into the horizontal panel joints whereby the vertical panel joints remain free and open for direct insertion of the elongated, one-piece gaskets.

5. A method of erecting panels to close and seal an open framework or grid of longitudinal and vertical support members where the support members are fitted with interior deformable gaskets operable to make peripheral contact with the interior surface of the panel comprising the steps of:

fitting panels within the support members against the interior peripheral gasket, spacing panels one from another to define panel joints, inserting small segments of an exterior gasket at spaced intervals along said joints to retain the panels temporarily, thereafter progressively inserting elongated, one-piece lengths of exterior gaskets into said joints in a given direction while progressively removing said small segments of exterior gasket, said one-piece length of exterior gasket extending along a continuous joint defined by a plurality of pairs of adjacent panels.

* * * * *